(12) United States Patent
Villanou

(10) Patent No.: US 9,686,920 B2
(45) Date of Patent: Jun. 27, 2017

(54) DEVICE FOR THINNING OUT A FRUIT TREE

(76) Inventor: Jean-Pierre Villanou, Narbonne (FR)

(*) Notice: Subject to any disclaimer, the term of this patent is extended or adjusted under 35 U.S.C. 154(b) by 192 days.

(21) Appl. No.: 14/000,584

(22) PCT Filed: Feb. 24, 2012

(86) PCT No.: PCT/FR2012/050386
§ 371 (c)(1),
(2), (4) Date: Aug. 20, 2013

(87) PCT Pub. No.: WO2012/114048
PCT Pub. Date: Aug. 30, 2012

(65) Prior Publication Data
US 2013/0326942 A1    Dec. 12, 2013

(30) Foreign Application Priority Data
Feb. 24, 2011   (FR) ...................................... 11 51509

(51) Int. Cl.
*A01G 3/08*    (2006.01)
*A01G 17/00*   (2006.01)
*A01G 3/00*    (2006.01)

(52) U.S. Cl.
CPC ........ *A01G 17/00* (2013.01); *A01G 2003/005* (2013.01)

(58) Field of Classification Search
CPC ........ A01B 41/00; A01B 41/04; A01M 21/00; A01M 21/02; A01G 3/00; A01G 3/04; A01G 3/047; A01G 17/00; A01D 34/416

USPC .................. 43/1.01 R, 1.43, 58.1 R; 172/534
See application file for complete search history.

(56) References Cited

U.S. PATENT DOCUMENTS

| 1,402,724 | A | * | 1/1922 | Stukenborg | ............ | A01D 46/10 |
| | | | | | | 209/380 |
| 2,707,859 | A | * | 5/1955 | Walker | ................. | A01D 34/416 |
| | | | | | | 172/15 |
| 3,315,753 | A | * | 4/1967 | Propst | .................... | A01B 41/04 |
| | | | | | | 172/108 |
| 4,035,912 | A | * | 7/1977 | Ballas | .................. | A01D 34/416 |
| | | | | | | 30/276 |
| 8,079,373 | B2 | * | 12/2011 | Wyatt et al. | ................... | 132/218 |
| 8,096,306 | B2 | * | 1/2012 | Malvar et al. | ................ | 132/218 |
| 2006/0042647 | A1 | * | 3/2006 | Vogel | ............................. | 132/218 |

FOREIGN PATENT DOCUMENTS

| DE | 38 18 640 A1 | 12/1989 |
| DE | 41 03 915 A1 | 8/1992 |
| FR | 2 379 245 A1 | 9/1978 |
| FR | 2 853 811 A1 | 10/2004 |

* cited by examiner

*Primary Examiner* — Danielle Clerkley
(74) *Attorney, Agent, or Firm* — Andrew W. Chu; Craft Chu PLLC

(57) ABSTRACT

The device for removing flowers from a fruit tree by pulling off from their branch is formed by a rod, a gripping and a puller. The gripper can be a handle. The puller is mounted at the end of the handle for pulling off flowers. The puller can be formed of at least one roller provided with fibers in the form of bristles, each roller being mounted articulated, freely rotating at the end of the rod, so that the transverse displacement of the rod into contact with the branch induces a rotation of each roller.

8 Claims, 1 Drawing Sheet

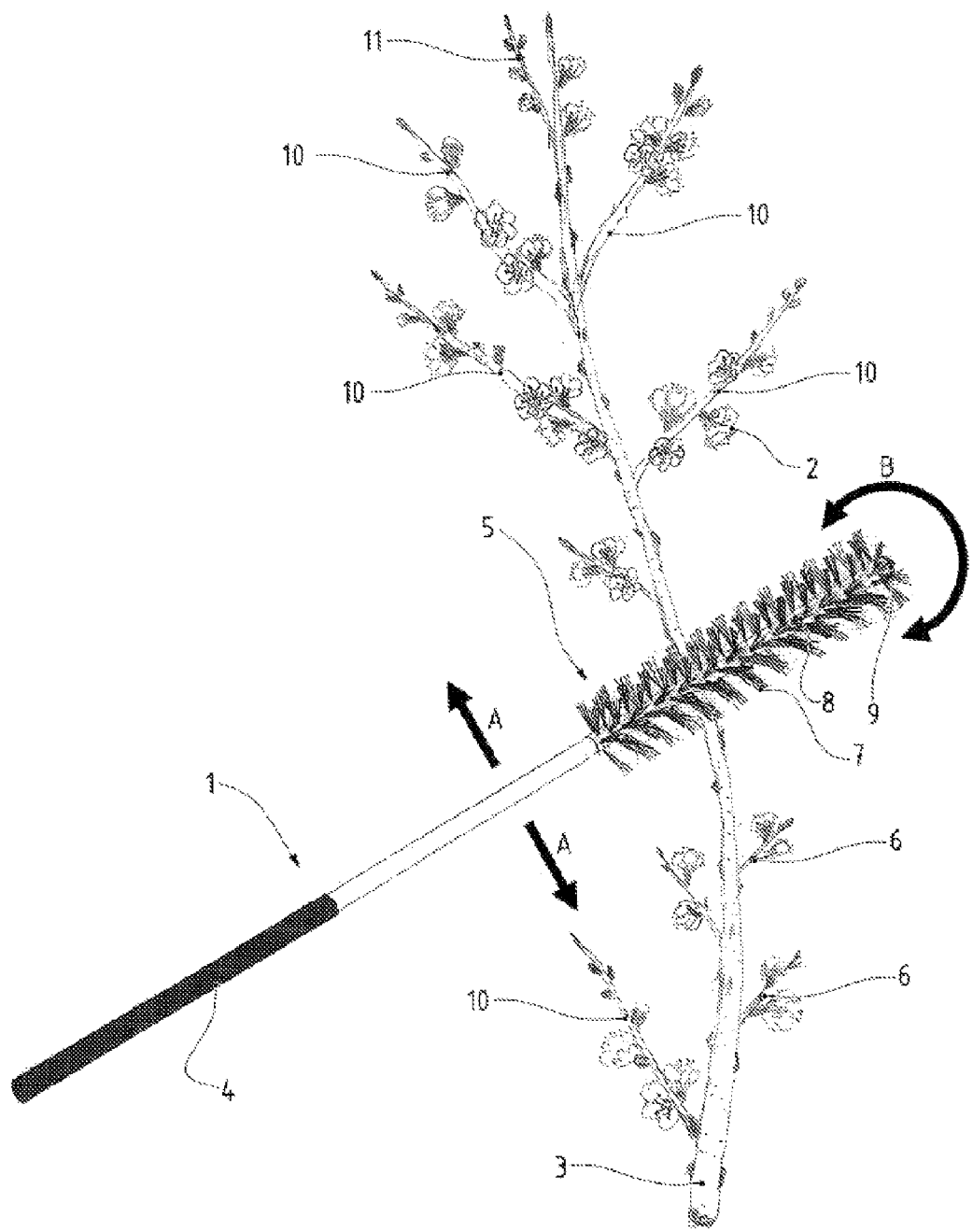

(1)

DEVICE FOR THINNING OUT A FRUIT TREE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention is related to the agricultural field, to the cultivation of fruit trees.

The invention relates in particular to the control of the abundance of flowers of a fruit tree.

To this end, it relates to a device for removing flowers from a fruit tree.

Such a device will find a particular, but non-restrictive, application in the removal of flowers from apricot trees, plum trees, and cherry trees.

2. Description of Related Art Including Information Disclosed Under 37 CFR 1.97 and 37 CFR 1.98

As is known, the number of flowers present on a fruit tree should be reduced, depending on the behavior of the species. This is indeed absolutely necessary for the self-fertile strains, namely in order to improve the quality, and the size of the fruits obtained, but also to lower the production cost. The thinning on flowers can occur at the stage of buds, full blossoming or at the fall of the petals, depending on the percentage of flowers one wants to remove.

Presently, this operation consists of removing the flowers by hand, namely by rubbing the fingers protected by gloves on the small branch. This operation by hand is long and tedious, implying a high labor cost. This cost is estimated to be in the range of 100 to 400 hours per hectare of fruit trees, depending on the strains and the years. In addition, the high branches remain difficult to access.

Therefore, devices for removing the flowers from the branches have been devised, namely, by pulling-off. There exists a clip provided with smooth rollers acting by scraping on both sides of a small branch, symmetrically on both sides of the latter. A major drawback resides in that the flowers pulled off remain caught in the vice formed by this clip, so that they cause a jamming, which makes the operation more difficult and causes all the successive flowers to be removed.

In addition, the retaining of the branch during this operation is not ensured. Such devices do not take into consideration the decreasing thickness of the small branches. Finally, the access to the high branches always raises a problem.

There also exist motorized, portable or large-size machines, the latter being fixed to a tractor. Their principle consists of motorizing in rotation an axis provided with flexible wires. These rotating wires then abut against the flowers, but also against the leaves, and the small branches. The young leaves and the most fragile twigs are destroyed, which is a major drawback and limits their use before the apparition of the young shoots. The yearly period of use of these machines is thus limited, and their use is aggressive for the tree. In addition, such machines require an expensive maintenance of the motorization mechanism.

An existing hand-held tool permits to cope with these drawbacks, in the form of a device for removing flowers from a fruit tree by pulling-off. This device is described in FR 2 914 815, filed by the applicant.

Such a device comprises gripping means in the form of a handle, at the end of which is placed a U-shaped lug. This device pretends to be capable of easily removing, without jamming, part of the flowers growing on a branch.

The U-shape permits an asymmetrical pinching on both sides of said branch.

This device for removing permits to pull off the flowers located on both sides of the branch, while preserving the flowers on the sides, or vice-versa.

However, its use is limited to the small branches, which do not include short shoots or early shoots, as such is the case on the peach tree, since these block the U of the pole and make it difficult to be used.

SUMMARY OF THE INVENTION

The invention is aimed at coping with the drawbacks of the technique, by providing a device for removing flowers from a fruit tree, which preserves the whole tree, i.e. the branches, the small branches, the twigs and short shoots, and the young leaves, and which can be used on all species.

Such a device comprises a roller provided with bristles, the rigidity of which permits the roller to start rotating when the axis of the roller is displaced, while the sufficiently rigid bristles engage with the vegetation. This device tends to easily remove the flowers, while preserving the tree.

These bristles form a more or less dense brush depending on the number of bristles and their arrangement on the roller. The diameter of this brush can be any diameter, in order to adapt to the various species of fruit trees. The bristles can preferably be rigid. The bristles can also be made of semi-rigid, flexible or elastic material and designed of any possible length.

Such a brush facilitates the use of the device on branches and ramifications, as this is the case for the apricot tree. This brush permits avoidance of damage to the small branches and the leaves, and even the young fruits when the thinning out intervention occurs at that stage.

To this end, it is characterized in that said means for pulling off said flowers comprise a roller provided with bristles, which penetrate into the vegetation, the displacement of the axis of the roller causing its rotation. The bristles then penetrate into the branches without violently beating them, since no mechanism causes the roller to rotate; in addition, its speed is perfectly proportional to the speed of displacement, since it is generated by the latter.

The aggregate of roller and tree can be compared to the pinion-and-rack system. The branches are the rack, the roller is the pinion, and the bristles represent the teeth of the pinion. The bristles smoothly penetrate into the branches, as do the teeth of an aggregate.

Since the flowers are the most fragile elements, it is enough to adapt the speed of displacement of the roller, the density of the bristles, their length as well as their rigidity depending on the expected effect.

The device for removing according to the invention permits to pull off the flowers on any kind of fruit tree, irrespective of the cross-section or the ramifications of the branches or small branches to be thinned out, while preserving the vegetation.

This device can be manual, the roller is placed at the end of a handle, and its rotation is achieved through the operator's movements.

It can also have larger dimensions and be self-propelled, towed or carried by means of transport.

Advantageously, its simplicity permits a cheap manufacture, which permits to reduce the thinning-out costs for an orchard.

In addition, according to a particular embodiment, the device according to the invention can be adapted in larger dimensions in order to be towed by means of a farming machine.

Therefore, each fiber comprises bristles or spikes extending over the whole or part of the length of said fiber. In addition, said bristles or spikes are fixed or mounted freely rotating about each fiber.

BRIEF DESCRIPTION OF THE DRAWINGS

Further features and advantages of the invention will become clear from the following detailed description of the non-restrictive embodiments of the invention, with reference to the attached FIGURE showing a particular embodiment in manual version of the device according to the invention during the operation of pulling off of the flowers present on a branch including ramifications.

FIG. 1 shows perspective view of an embodiment of the present invention.

DETAILED DESCRIPTION OF THE DRAWINGS

The present invention relates to a device for removing flowers 2 from a fruit tree by pulling off from the branch 3.

Such a device 1 is in the form of a longitudinal rod, such as a pole, and comprises gripping means in the form of a handle 4. The latter can be covered with a handgrip or a coating improving the gripping by a user. This handgrip can be of any shape and be ergonomically shaped in order to facilitate the holding in the hand as well as the handling of the device 1.

It should be noted that the rod can be designed in various lengths or with a varying length, for example by means of telescopic sections. In addition, it can be designed massive or hollow, with any possible cross-section, preferably a round cross-section.

At the opposite end of the handle 4, pulling-off means 5 are mounted on the rod, which are in the form of at least one roller 8, such as an articulated hairy sleeve rotating with respect to the handle. Said pulling-off means 5 are advantageously shaped so as to penetrate into the ramifications of said branch 3. In particular, the pulling-off means 5 comprise bristles 7 that rest on the branch 3 and all the ramifications formed by stingers 6, small branches 10, and twigs 11.

In brief, the pulling-off means 5 are mounted freely rotating about the longitudinal axis of the rod, as shown by the double arrows showing the two directions of rotation B.

Therefore, a transverse movement of the device (designated by the arrows A in the FIGURE) along the branch 3 causes the putting into rotation of the pulling-off means 5 braked by the resistance of the bristles 7 resting against the branch 3, and removes part of the flowers 2 over the whole periphery of the branch 3 where said pulling-off means 5 are into contact. Since the stems of the flowers 2 are flexible, but not very strong, the mere contact by the bristles 7 causes their pulling-off.

In contrast, the flowers 2 that have grown at the level of the branch 3 where the pulling-off means 5 do not enter into contact remain intact.

Depending on the placing of the pulling-off means 5 resting on the branch 3, the flowers 2 can be pulled off at the upper side, the lower side or at the upper and lower side of the branch 3, depending on the travel path imposed on the pulling-off means 5.

In addition, this effect of penetration of the bristles 7 permits to cause the rotation of the pulling off means 5. The change in speed of displacement A, in depth of penetration into the branches, the density, the length, and the rigidity of the pulling-off means 5 permits to adapt the intensity of removal of flowers 2.

According to the preferred embodiment, said pulling-off means 5 are formed of at least one roller 8 provided with bristles 7. As evoked above, the features and the implanting of the elements 1 permit to create spaces for the evacuation of the flowers being pulled off as well as to save the flowers that will remain on the branch 3 after the device 1 has passed on it.

According to a preferred embodiment, the bristles 7 are mounted radially in the form of rings regularly spaced apart along said pulling-off means 5 or in the form of at least one spiral rotating about the axis of said pulling-off means 5, like the pitch of a screw.

In particular, this roller 8 can be provided with bristles 7 of any nature and any dimensions, whether or not forming a cylinder about the longitudinal axis of the pulling-off means 5. One of the sides of this roller 8 is then connected freely swiveling to said handle 4, so as to permit its rotation. The other end 9 may be left free, or be fixed if the dimensions of the roller so require.

The dimensions and the type of bristles 7 of the roller 8 can be defined depending on the kind of fruit tree, namely depending on the cross-section and the shape of its branches 3 as well as on the size of the trees, and the stage of blossoming at the time of the intervention.

In addition, according to a particular embodiment, said bristles 7 can consist of a rigid, soft or flexible material. In brief, the axis of the pulling-off means 5 can be designed rigid or flexible.

It should be noted that the roller 8 can be of any dimensions, in order to be adapted to the kind of tree to be thinned out.

During the thinning-out, the user holds the device 1 by the gripping means 4. He passes the pulling-off means 5 above, or under the selected branch 3, then with a simple arm movement, he brings the roller 8 into contact with the branch 3, causing the bristles 7 to penetrate into the branching. In this position, putting the device 1 into motion while maintaining the contact with the branch 3 causes the roller 8 to rotate. This produces the entering into contact of the bristles 7 with the flowers 2 and causes their pulling-off.

Preferably, the bristles 7 of the roller 8 perforate the flowers 2, which are then pulled off and fall on the ground.

The blocking against a stinger 6, a twig 11, or a small branch 10 is impossible, because the roller 8 then rolls over the obstacle before returning into contact with the branch 3. In addition, the travel path and the speed of the roller 8 can easily be controlled by the operator, this avoids damaging all the ramifications formed by stingers 6, small branches 10, twigs 11 of the branch 3. The control of the speed and the penetration of bristles 7 also permits to adapt to the presence of the ramifications formed by stingers 6, small branches 10, twigs 11 and to the rigidity of the branch 3 along the latter.

Advantageously, according to a particular embodiment, not shown, at the end of the handle 4 can be mounted a set of several rollers 8, in order to facilitate the passing over obstacles formed by the ramifications formed by stingers 6, small branches 10, and twigs 11.

More specifically, the rollers 8 are mounted so as to permit their rotation with respect to the handle 4. In particular, the rollers 8 can be three in total, adjusted co-linearly, having the general shape of a prism with a triangular base. Each of said rollers 8 is mounted freely rotating. In addition, the set of three rollers 8 can also be mounted freely rotating with respect to the rod of the device 1.

Thus, during the displacement of the leading roller 8, should a blocking occur, which is not overcome by the rotation of said roller 8 itself, then the set of three rollers 8 rotates and another roller 8 leads the transverse displacement of said device.

Another particular embodiment, not shown, is formed of one or several rollers 8 of a sufficient size and arranged so as to permit the thinning-out of an entire tree.

Such a device 1 can be carried by hand or towed by a means of transport. The principle remains the same, the bristles 7 mounted on the roller 8 penetrate into the ramifications of the tree; then, the displacement of the means of transport causes the roller 8 to rotate.

These bristles 7 form a more or less dense brush, depending on the number of bristles 7 and their arrangement on the roller 8. The bristles may preferably be rigid. The bristles may also be made of semi-rigid, soft or elastic material and designed of any possible length and thickness.

Such a brush facilitates the use of the device 1 on branches 3 provided with ramifications formed by stingers 6, small branches 10, and twigs 11, as this is the case with the apricot tree. This brush permits not to damage the small branch 10, even the young fruits when the thinning-out intervention occurs at that stage.

As evoked above, such a device 1 can be designed towed and mounted on a farming machine. This device then has larger dimensions. The gripping means are then the means for fastening to said machine.

According to an embodiment of said device 1 mounted on a farming machine, the roller is a brush comprised of fibers, the bristles 7 or spikes are received on the fibers, in the same way as the bristles 7 are directly on the roller 8 of the hand-carried device 1. These bristles 7 can be rigid, semi-rigid or flexible.

In addition, the fibers can be mounted fixed, but also freely rotating. In brief, each fiber of this large brush is formed by a manual brush identical to the one described above. Therefore, in addition to the rotation of this large brush during the progress of the machine, each fiber can rotate on itself in contact with the branches 3, ensuring the pulling-off of the flowers 2.

It should be noted that in the case of rigid or semi-rigid bristles 7, the pulling-off of the flowers 2 can occur through piercing. Indeed, the bristles 7 then pierce the flowers 2, which, being hooked on, remain trapped by the brush and are pulled off their branch 3.

The invention largely facilitates the thinning-out of a fruit tree by means of a simple and cheap device 1. Being of an easy and fast use, it saves a large number of labor hours and permits to remove from 30 to 70% of the flowers 2. In addition, it can be used during a larger period, since there is no restriction as to the stage of development of the flowers 2 to be pulled off, and the eventual presence of young shoots.

In addition, such a device 1 does not require motorization means for the pulling-off means 5. The rotation is natural, not excessive, as is the case with the existing devices that rotate at prejudicial speeds that pull off without any distinction and bruise the tree. In contrast, the invention has no motorization for the pulling-off means 5, rotates at the speed of progress of the device 1 and, especially, depending on the resistance in the branches 3, thus without any risk of damaging the branches 3 and the tree. Indeed, the roller 8 rolls naturally over the vegetation, which forms its raceway. This principle avoids the frictions and the damages they cause to the tree.

I claim:

1. A system for thinning out a fruit tree consisting of:
   a branch of said fruit tree having flowers, fruits or both attached thereto;
   a rod for actuation along said branch, said rod having a first end and a second end;
   a gripping means on said first end of said rod; and
   a pulling-off means on a second end of said rod so as to remove a part of said flowers, fruits or both from said branch, wherein said pulling-off means is comprised of at least one roller with fibers, the at least one roller being rotatable with respect to said rod, and wherein transverse displacement of said rod along said branch induces rotation of the at least one roller.

2. The system for thinning out a fruit tree, according to claim 1, wherein the at least one roller is rotatably mounted on said rod, the at least one roller having an axis of rotation aligned with a longitudinal axis of said rod.

3. The system for thinning out a fruit tree, according to claim 1, wherein said fibers are at least one of a group consisting of: rigid, semi-rigid and flexible.

4. The system for thinning out a fruit tree, according to claim 1, wherein said fibers extend at least part of a length of said at least one roller.

5. The system for thinning out a fruit tree, according to claim 1, wherein said pulling-off means are at least one of a group consisting of flexible and rigid.

6. The system for thinning out a fruit tree, according to claim 1, further comprising:
   a farming machine, said gripping means being attached to said farming machine, said rod being fastened to said farming machine, wherein towing movement of said farming machine corresponds to actuating said rod along said branch, wherein the at least one roller is arranged so as to form a brush, each fiber being comprised of a set of bristles extending along at least part of a length of a respective fiber.

7. The system for thinning out a fruit tree, according to claim 6, wherein each bristle of said set of bristles is fixed on the respective fiber.

8. The system for thinning out a fruit tree, according to claim 6, wherein each bristle of said set of bristles rotates around the respective fiber.

* * * * *